(12) United States Patent
Fujiwara

(10) Patent No.: US 6,276,226 B1
(45) Date of Patent: Aug. 21, 2001

(54) CYCLOIDAL GEAR WITH SMALL NUMBER OF TEETH

(75) Inventor: Kotonori Fujiwara, Kosai (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/422,753

(22) Filed: Oct. 21, 1999

(30) Foreign Application Priority Data

Oct. 27, 1998 (JP) .................................................. 10-306055

(51) Int. Cl.⁷ .................................................. F16H 55/02
(52) U.S. Cl. .................................................. 74/462
(58) Field of Search .................................................. 74/462

(56) References Cited

U.S. PATENT DOCUMENTS

| | | | |
|---|---|---|---|
| 2,666,336 | * | 1/1954 | Hill et al. ................................ 74/462 |
| 4,321,839 | * | 3/1982 | Vuilleumier ........................... 74/462 |
| 4,922,781 | * | 5/1990 | Peiji ....................................... 74/462 |

FOREIGN PATENT DOCUMENTS

61-244966   10/1986   (JP) .

\* cited by examiner

*Primary Examiner*—Allan D. Herrmann
(74) *Attorney, Agent, or Firm*—Kilpatrick Stockton LLP

(57) ABSTRACT

A cycloidal gear with a small number of teeth includes a tooth of cycloid tooth. In the above construction, the number of teeth is four or five; and the cycloidal gear with a small number of teeth meshes with a large gear with cycloid tooth to constitute a gear train.

1 Claim, 10 Drawing Sheets

CYCLOIDAL GEAR WITH SMALL NUMBER OF TEETH

BACKGROUND OF THE INVENTION

1. Field of the Invention

The present invention relates to a cycloidal gear, and in particular to a cycloidal gear with a small number of teeth, which is used as a pinion, or a small diameter gear, of a gear, or large diameter gear, and the pinion constituting a reduction gear mechanism.

2. Description of the Related Art

Conventionally, a gear with involute tooth has been used as a gear, and a gear train has been constituted by combining a gear with the involute tooth and a pinion therewith. When gear ratio is intended to be increased by reducing the tooth number of the pinion, undercut occurs at a deddendum of the pinion. As a method for solving the undercut, a shift method has been proposed, but, when the tooth number of the pinion is reduced, strength and durability thereof deteriorate remarkably. Therefore, the pinion is required to have six or more teeth in practical use. Assumed that the tooth number of a pinion is denoted by Z1 and the tooth number of a gear is denoted by Z2, the gear ratio is represented by Z2/Z1.

On the other hand, a logix gear (for example, refer to Japanese Patent Application Publication (JP-B) No. 2-15743) has been developed in recent years. In the logix gear, a tooth has been formed by connecting a plurality of involute curves of micro-distances to one another in a continuously curved manner. For this reason, when the logix gear is used, the shape of a tooth can be designed in a various manner. According to this design, a pinion can be obtained which does not cause any problem regarding its strength even when the pinion has only four teeth, thereby making it possible to develop a gear train of a high gear ratio.

However, there occurs a problem that, when a gear or a pinion to which the logix gear is applied is designed, calculations for connecting a remarkable number of involute curves to one another continuously are repeated many times for various tooth shapes, so that much time is required to complete the design of the gear or the pinion.

SUMMARY OF THE INVENTION

In view of the above circumstances, the present invention has been attained, and an object thereof is to provide a cycloidal gear where a gear or pinion with a small number of teeth can easily be designed in a short time by using a cycloid tooth as a tooth profile of the gear.

In order to solve the above problem, the invention of a first aspect is a cycloidal gear with a small number of teeth, comprising: a tooth of cycloid tooth, wherein the number of teeth is four or five; and wherein the cycloidal gear with a small number of teeth meshes with a large gear with cycloid tooth to constitute a gear train.

The invention of a second aspect is a cycloidal gear according to the invention of the first aspect, wherein a tooth thickness ratio (T) calculated assuming a circle pitch as a denominator and a tooth thickness on the pitch circle as a numerator, is 0.655 to 0.741; epi-rolling circle radius (r1) is 3.5 to 6.5 mm/1 module; hypo-rolling circle radius (r2) is 1.97 to 2.60 mm/1 module; addendum height (h1) is 0.68 to 1.14 mm/1 module; and deddendum height (h2) is 0.454 to 1.650 mm/1 module.

In the invention of the first aspect, a gear or pinion constituted with four teeth can be formed which is practical and is usable to the same degree as the logix gear which has actual results with four teeth. For this reason, a gear or pinion with five or four teeth can be provided which can not be obtained by a gear or pinion with involute tooth. Accordingly, for example, when the gear or pinion of the invention of the first aspect is used as one gear or pinion in a reduction gear mechanism, a large reduction ratio can be obtained at once and the reduction gear mechanism can be reduced in size. Also, since a cycloid curve is used as the tooth of the gear, calculations for design are simplified and a gear or pinion with a desired number of teeth can be designed in a short time.

In the invention of the second aspect, the tooth thickness ratio (T) is set to 0.655 to 0.741, the epi-rolling circle radius (r1) is set to 3.5 to 6.5 mm/1 module, the hypo-rolling circle radius (r2) is set to 1.97 to 2.60 mm/1 module, the addendum height (h1) is set to 0.68 to 1.14 mm/1 module, and the deddendum height (h2) is set to 0.454 to 1.650 mm/1 module, so that, even when the tooth number of the gear or pinion is set to four or five, the meshing ratio of 1.0 or more can be secured and the deddendum strength of the gear can be secured sufficiently without occurrence of undercut and/or tip sharpening.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENT

Figure 1:
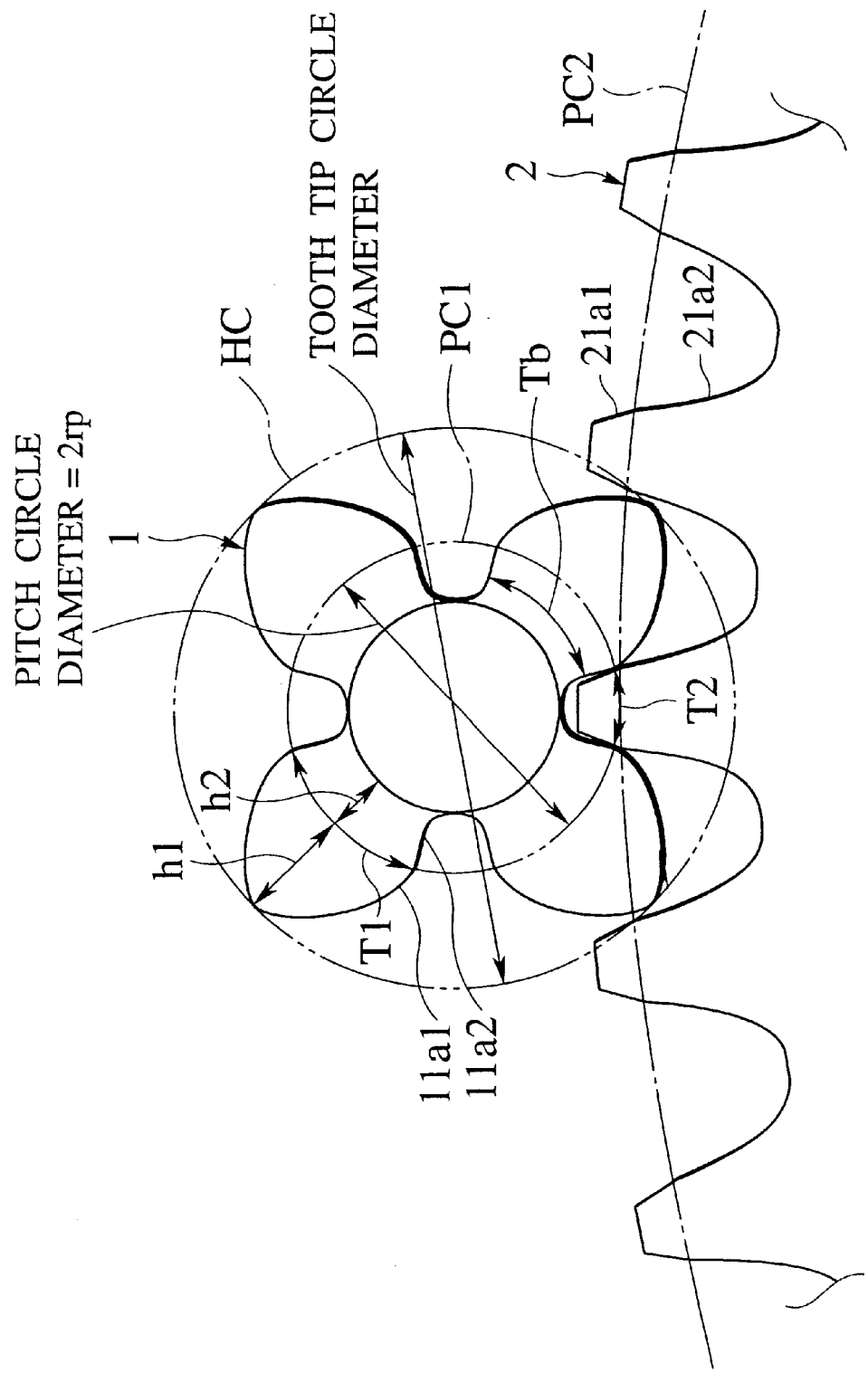
FIG. 1 is a front view of a main portion of a cycloidal gear train with a high gear ratio illustrated as one embodiment of the present invention.

There will be detailed below the preferred embodiments of the present invention with reference to the accompanying drawings. Like members are designated by like reference characters. An embodiment of the invention will be explained with reference to FIGS. 1 to 16.

As illustrated in FIG. 1, a cycloidal gear train G with a high gear ratio shown with this embodiment comprises a gear or large diameter gear 2 with cycloid tooth and a pinion or small diameter gear 1 with cycloid tooth meshing with the gear 2, and the pinion 1 is characterized by comprising four teeth.

The cycloidal gear train G is characterized in that tooth thickness ratio T obtained by a calculation where the sum of a tooth thickness T2 on a pitch circle PC2 of the gear 2 and a tooth thickness T1 on a pitch circle PC1 of the pinion 1 is assumed to be a denominator and the tooth thickness T1 on the pitch circle PC1 of the pinion 1 is assumed to be a numerator is 0.655 to 0.741. The cycloidal gear train G is also characterized in that an epi-rolling circle radius r1 is 3.5 to 6.5 mm/l module, a hypo-rolling circle radius r2 is 1.97 to 2.60 mm/l module, a addendum height h1 of the pinion 1 is 0.68 to 1.14 mm/l module, and a deddendum height h2 of the pinion 1 is 0.454 to 0.650 mm/l module.

The tooth thickness ratio T becomes approximately the same value as the above, even when the circle pitch of the pinion 1 is assumed to be a denominator and the tooth thickness T1 on the pitch circle is assumed to be a numerator. Also, a unit of mm/l module is a length at a time of module 1.0, and it is changed in proportion to change in module. For example, in module 2.0, the above numerical values respectively become double.

The above structure will further be explained in detail. Design conditions that a gear or a pinion is obtained practically are set, and the pinion 1 with four teeth and the gear 2 meshing with the pinion 1 are designed under the conditions (the pinion 1 will mainly be explained in this embodiment). The design conditions are the following (1) to (6).

(1) Meshing ratio L is 1.0 or more;
(2) Tip of the pinion 1 is not sharpened;
(3) Deddendum tooth thickness of the pinion 1 is secured sufficiently. Particularly, the deddendum tooth thickness is made equal to or more than that of the logix gear which has already actual results with four teeth;
(4) Deddendum tooth thickness of the gear 2 is secured sufficiently. Particularly, the deddendum tooth thickness is made equal to or more than that of a gear formed of the logix gear meshing with the above-mentioned logix gear with four teeth;
(5) Tooth bottom portion which does not interfere with a tooth adjacent thereto can be obtained; and
(6) Pressure angle is 30° or less.

Accordingly, a pinion with five teeth which meets a requirement sufficiently can be obtained when it is manufactured under the above conditions.

Of course, a pinion compared to the logix gear can be manufactured even out of the above conditions.

When the pinion 1 with four teeth meets the above design conditions, a pinion with five or more teeth is also obtained securely without any problem. Namely, in a case of the gear with five teeth, the conditions for forming the gear with four teeth are expanded as they are, and the limitation range can be made wider. For these reasons, when a pinion with five teeth is manufactured under the conditions meeting the pinion with four teeth, one meeting the above design conditions can be obtained. Of course, the pinion with five teeth meeting the above design conditions can be manufactured even out of the limitation range of the pinion with four teeth. Giving a supplementary explanation, the meshing ration of the above condition (1) means the number of teeth where the pinion 1 meshes with the gear 2 simultaneously. When the meshing ratio is less than 1.0, a smooth rotation transmission can not be obtained between the pinion and the gear, so that a meshing ration of 1.0 or more is required. On the contrary, when the meshing ratio is less than 1.0, a state where the pinion and the gear do not mesh with each other occurs, so that chattering noises become large, which means that a set of the pinion and the gear obtained does not constitute a satisfactory gear mechanism.

Figure 5:
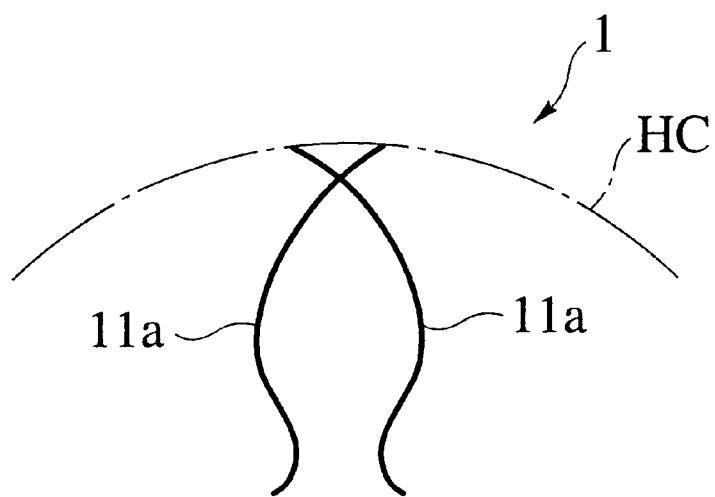
FIG. 5 is an explanative view showing a tip sharpening which should be preventing from occurring in each gear in the cycloidal gear train with a high gear ratio.

The sharpening of an addendum or a tip of the pinion 1 of the above condition (2) means that, before left and right tooth faces 11a reach an addendum circle HC, they intersects each other and an addendum is put in a sharpened state, as illustrated in FIG. 5. When the addendum is put in such a sharpened state, there arises a problem in which, since the tooth does not reach a normal addendum circle, meshing of gears can not be obtained. Accordingly, it is necessary to prevent an addendum or a tip from being sharpened.

The deddendum circle thickness of the above conditions (3) and (4) means a deddendum tooth thickness Tb at the thinnest portion of a tooth, for example, in the pinion 1 illustrated in FIG. 1. Since the maximum bending moment generally acts on a deddendum in a gear or a pinion, the strength of the gear or pinion is reduced as the deddendum tooth thickness becomes thinner. Accordingly, in this embodiment, the deddendum tooth thickness is restricted within ±10% of a deddendum tooth thickness of the logix gear of a pinion with four teeth or the logix gear of a large gear therewith which has good actual results and the strength of the gear or pinion is prevented from being lowered in an actual aspect.

By comparing the deddendum tooth thickness of the gear or pinion of the present invention with that of the logix gear, it can be determined whether or not the strength of the gear or pinion of the present invention relative to the logix gear is good. It should be noted that the reason why the deddendum tooth thickness of the present invention is −10% or more is based upon a determination that the strength of the pinion 1 may be lowered when the deddendum tooth thickness is less than −10%, and the reason why it is +10% or less is based upon a determination that an interference of the tooth bottom portion occurs, for example, the tooth thickness of the gear 2 meshing with the pinion 1 may become too thin or the like.

Figure 6:
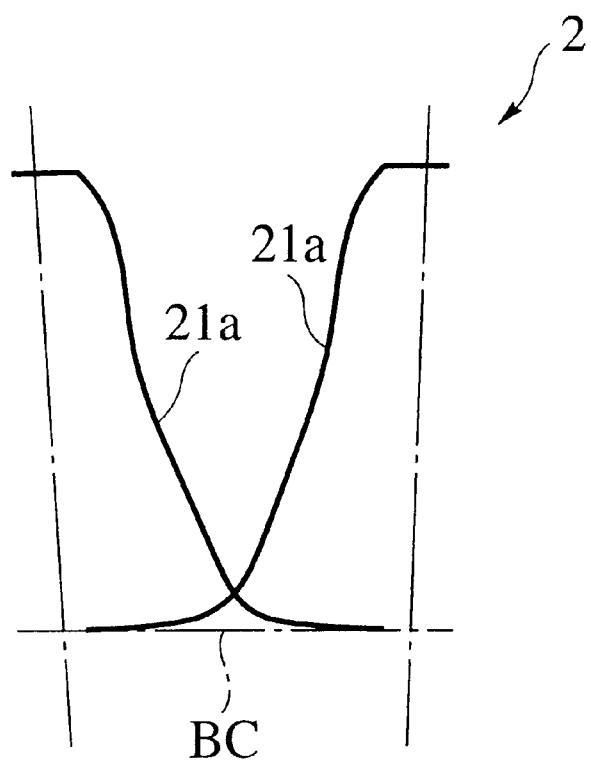
FIG. 6 is an explanative view showing an interference of a tooth bottom portion which should be prevented from occurring in each gear in the cycloidal gear train with a high gear ratio.

The interference of the tooth bottom portion with the adjacent tooth of the above condition (5) means that, for example, the tooth thickness of left and right tooth flanks 21*a* on the gear 2 intersects each other, before they reach the tooth bottom circle BC, as shown in FIG. 6. Such an interference of the tooth bottom occurs when the deddendum tooth thickness is made too thick, which results in failure in design of a gear or pinion. Such an interference must be prevented.

The pressure angle of the above condition (6) becomes larger from the pitch circle PC towards an addendum or towards a deddendum in the cycloid tooth. As the pressure angle α becomes larger, the strength becomes advantageous, but noises become larger. Accordingly, the pressure angle α is ingeneral limited to at most 30°.

Figure 2:
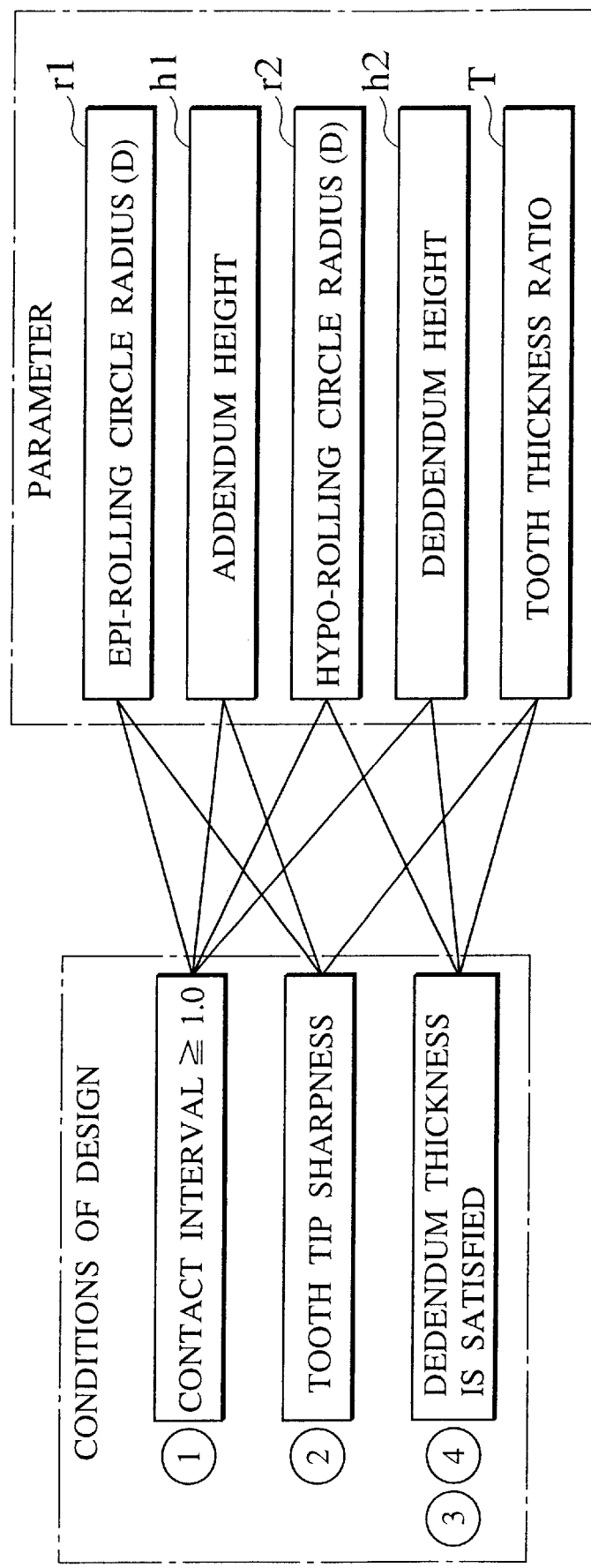
FIG. 2 is an explanative block diagram illustrating a relationship between conditions and parameters for designing the cycloidal gear train with a high gear ratio.

In order to meet the above design conditions, calculations performed with various parameters for determining the cycloid tooth are required. For example, a relationship between the design conditions and the parameters is shown in FIG. 2. That is, the meshing ratio of the above condition (1) is mainly related to a relationship among the epi-rolling circle radius (diameter) r1, the addendum height h1, hypo-rolling circle radius (diameter) r2, the deddendum height h2, and the tooth thickness ratio T. Further, the tip sharpening of the above condition (2) is mainly related to a relationship among the epi-rolling circle radius r1, the addendum height h1 and the tooth thickness ratio T. Furthermore, the deddendum circle thickness of the above conditions (3) and (4) is mainly related to the hypo-rolling circle radius r2, the deddendum height h2, and the tooth thickness ratio T.

Next, how to calculate various parameters for designing the pinion 1 with four teeth on the basis of the above design conditions will be explained.

Figure 3:
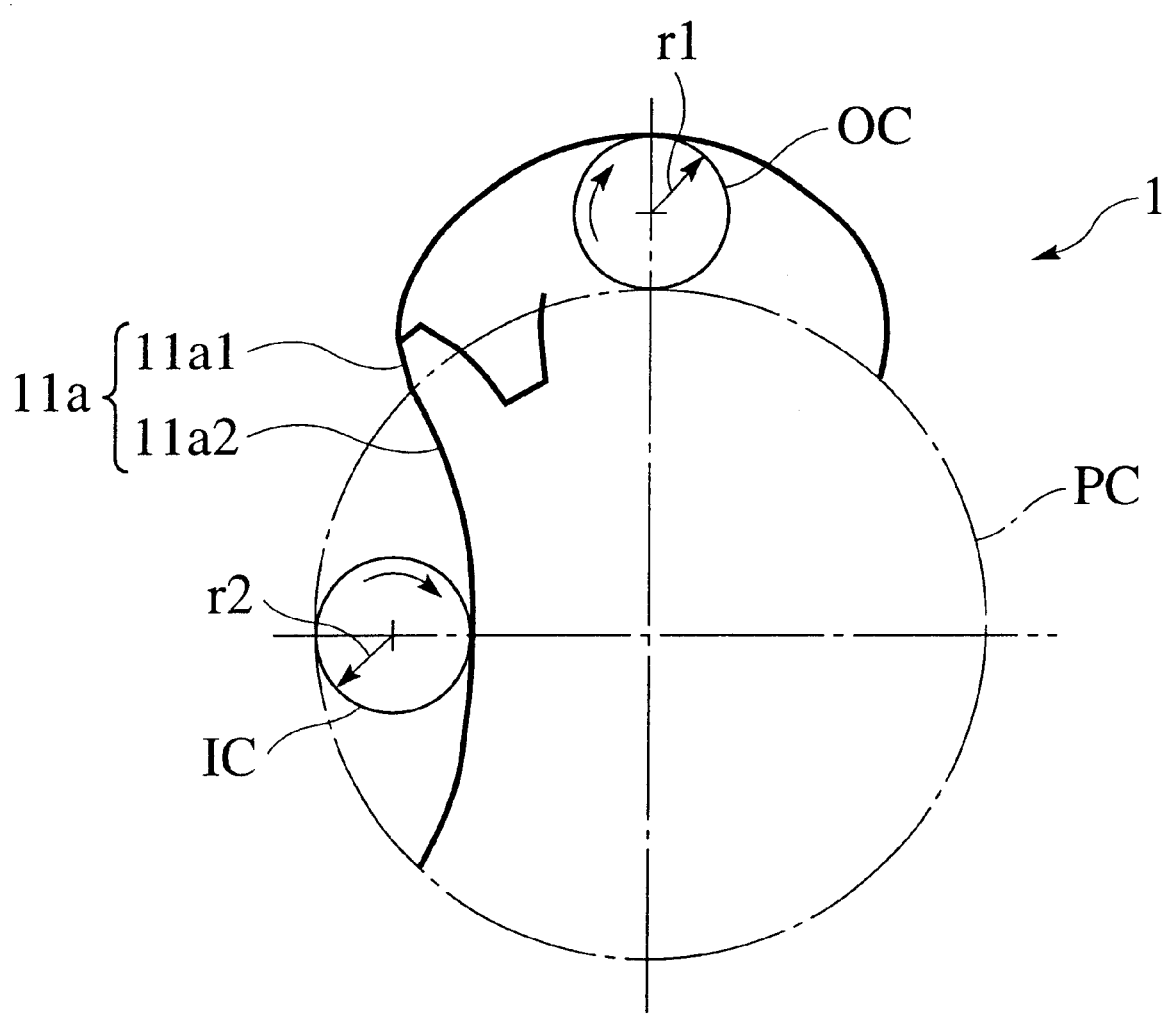
FIG. 3 is an explanative view showing a cycloid tooth in the cycloidal gear train with a high gear ratio.

First, the cycloid tooth will be explained. As illustrated in FIG. 3, the cycloid tooth has a tooth formed by using 2 cycloid curves at the tooth face and the deddendum to connect the curves to each other. That is, in a case of the pinion 1, when an epi-rolling circle OC is rolled on an outside of the pitch circle PC without sliding, a locus of a point on the epi-rolling circle OC becomes a tooth 11*a*1 of the tooth face. Also, when a hypo-rolling circle IC is rolled on an inside of the pitch circle PC without sliding the circle IC, a locus of a point on the hypo-rolling circle IC becomes a tooth 11*a*2 of the deddendum. A cycloid tooth 11*a* of each tooth is formed by the tooth 11*a*1 of the tooth face and the tooth 11*a*2 of the deddendum.

Figure 4:
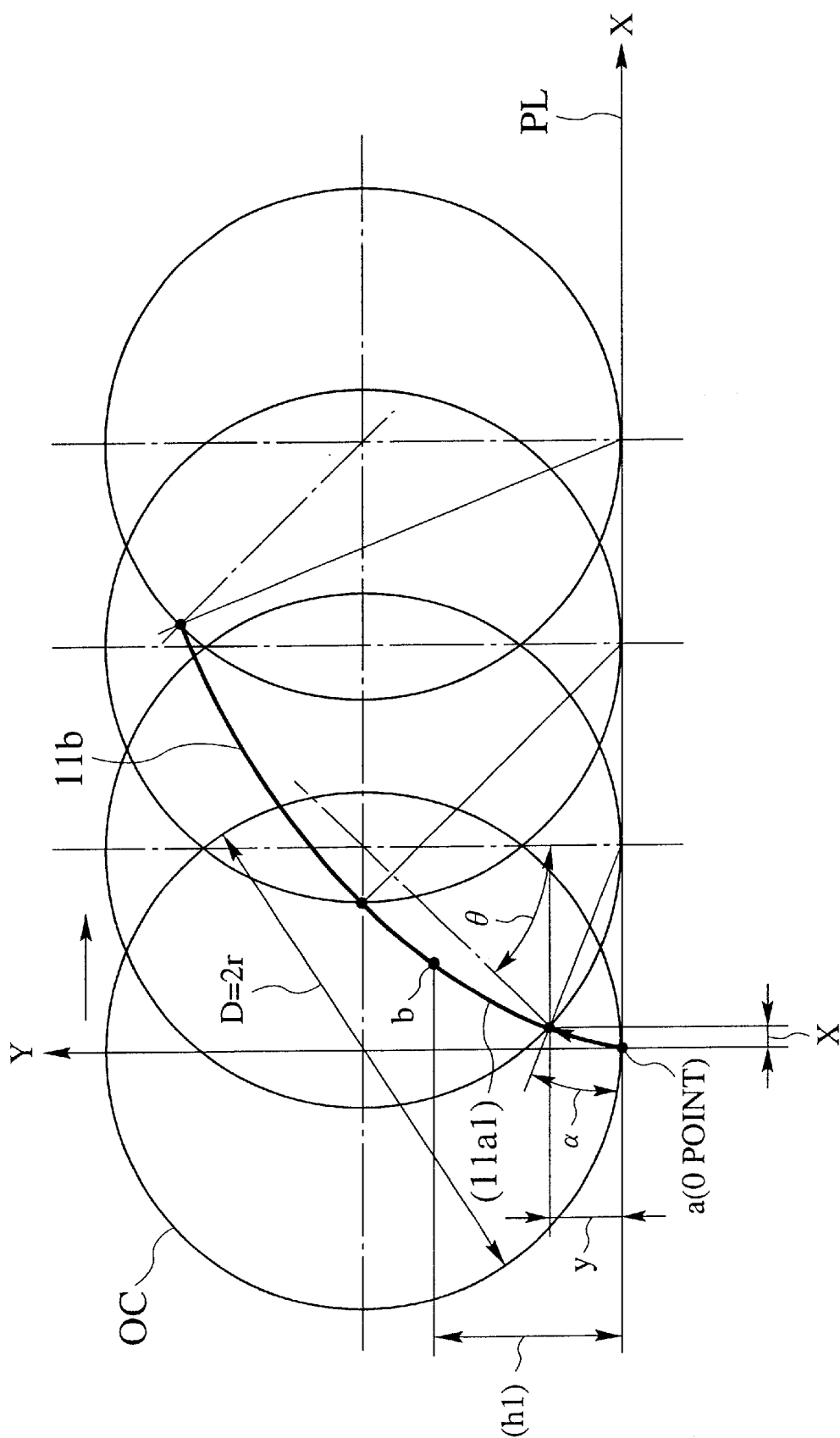
FIG. 4 is an explanative view showing a reference rack tooth which has been studied as a pre-stage before the cycloid tooth is constituted for the cycloidal gear train with a high gear ratio.

Here, the cycloid tooth 11*a* is not studied directly from such a gear or pinion shape as shown in FIG. 3, but the cycloid tooth 11*b* is studied from a reference rack shown in FIG. 4. That is, when a diameter of a pitch circle is made indefinite, the pitch circle becomes a linear-like pitch line PL, as shown in FIG. 4. A locus of a point on the epi-rolling circle OC obtained when the epi-rolling circle OC is rolled on the pitch line PL becomes the cycloid tooth 11*b*. The tooth reaching from a point a to a point b corresponds to the tooth 11*a*1 of the tooth face and a height in a vertical direction from the pitch line PL to the point b, namely a height in they direction, corresponds to the addendum height h1. Also, when the hypo-rolling circle IC is rolled below the pitch line PL, one corresponding to the tooth 11*a*2 of the deddendum according to cycloid curves can be obtained.

Also, in FIG. 4, assuming that a direction where the epi-rolling circle OC is rolled along the pitch line PL is plus direction of the X axis, a direction perpendicular to the X axis and positioned on a side of the epi-rolling circle OC is plus direction of the Y axis, a point where the epi-rolling circle OC contacts with the X axis at a starting point of rolling is a point a, and a position of the point a is 0 point of the X axis and the Y axis, xy coordinates of any point on the cycloid tooth 11*a* are as follows:

$$x = (D/2) \cdot \theta - (D/2) \cdot \sin \theta \quad (1)$$

$$y = (D/2) \cdot (1 - \cos \theta) \quad (2)$$

$$r = D/2 \quad (3)$$

$$\alpha = \theta/2 \quad (4)$$

wherein

D: diameter of the epi-rolling circle OC or the hypo-rolling circle IC (mm/1 module)

θ: rolling angle (rad) of the epi-rolling circle OC or the hypo-rolling circle IC r: radius of the epi-rolling circle OC or the hypo-rolling circle IC (mm/1 module)

α: pressure angle (rad)

Then, a gear or pinion tooth can be obtained by converting a pitch circle diameter from the reference rack tooth.

Next, the meshing ratio L of the pinion 1 and the gear 2 is calculated. The meshing ratio L can be obtained according to the following equations.

$$L = L1 + L2 \quad (5)$$

$$L1 = f1/Cp \quad (6)$$

$$L2 = f2/Cp \quad (7)$$

$$f1 = 2 \cdot r1 \cdot \tan^{-1} \sqrt{\frac{h1 \cdot (2 \cdot rp + h1)}{(2 \cdot rp + 2 \cdot r1 + h1)(2 \cdot r1 - h1)}} \quad \text{[Equation 1]}$$

$$f1 = 2 \cdot r1 \cdot \tan^{-1} \sqrt{\frac{H1 \cdot (2 \cdot Rp + H1)}{(2 \cdot Rp + 2 \cdot R1 + H1)(2 \cdot R1 - H1)}} \quad \text{[Equation 2]}$$

wherein

L: meshing ratio

L1: meshing ratio of the tooth face of the pinion 1

L2: meshing ratio of the tooth face of the gear 2

Cp: circle pitch (mm/1 module)

r1: epi-rolling circle radius of the pinion 1 (mm/1 module)

R1: epi-rolling circle radius of the gear 2 (mm/1 module)

rp: pitch circle radius of the pinion 1 (mm/1 module)

Rp: pitch circle radius of the gear 2 (mm/1 module)

h1: addendum height of the pinion 1 (mm/1 module)

H1: addendum height of the gear 2 (mm/1 module)

Furthermore, the tooth thickness ratio T is calculated according to the following equations.

$$T = T1/(T1 + T2) \quad (10)$$

$$(T1 + T2) \approx Cp \quad (11)$$

wherein

T: tooth thickness ratio

T1: tooth thickness on a pitch circle of the pinion 1 (mm/1 module)

T2: tooth thickness on a pitch circle of the gear 2 (mm/1 module)

Next, values of the parameter required to make the number of teeth of the pinion 1 to be four are calculated by using the above numerical equations or the like. First, (A) the tooth thickness ratio T is set to a value, for example, 0.685 used for the logix gear with four teeth, and (B) the addendum height h1 is set to a value, for example, 0.91 mm/1 module. Then, (C) the epi-rolling circle radius r1 meeting the above design conditions is calculated. That is, the epi-rolling circle radius r1 is calculated as design conditions including the condition (1) where the meshing ratio L is 1.0 or more, the condition (2) where the tip is not sharpened (addendum tooth thickness >0), the condition (4) where the deddendum tooth thickness of the gear 2 is sufficiently thick, or the like.

It should be noted that the meshing ratio L of the condition (1) is calculated by using the meshing ratio of tooth face of the pinion 1, i.e., L1>0.672. The numerical value of the 0.672 is calculated from the above numerical equations (5) to (9) and the minimum meshing ratio 1.0. Then, as the sum of the meshing ratio L1 of the tooth face of the pinion 1 and the meshing ratio L2 of the tooth face of the large gear 2 is 1.0 or more, and there is a relationship of (the tooth face of the gear 2)=(the deddendum of the pinion 1), the meshing ratio of the deddendum of the pinion 1 described later >0.328 is also determined. Also, as the deddendum tooth thickness of the gear 2 in the condition (4) is set to ±10% of the logix gear which has actual results with four teeth, the condition of 0.619 mm/1 module<the deddendum tooth thickness of the gear 2 <0.756 mm/1 module is met.

(D) After the epi-rolling circle radius r1 meeting the above respective design conditions is calculated, returning back to the above (B), the epi-rolling circle radius r1 is calculated repeatedly while changing the addendum height h1.

Thereby, (E) respective ranges of the addendum height h1 and the epi-rolling circle radius r1 in a predetermined circle thickness ratio T become apparent. Then, (F) returning back to the (A), the similar calculation is repeated while changing the value of the circle thickness ratio T.

Also, (G) the hypo-rolling circle radius r2 and the deddendum height h2 are calculated like the cases of the epi-rolling circle radius r1 and the addendum height h1. The design conditions includes the condition (1) of the meshing ratio (corresponding to L2) of the deddendum of the pinion 1 >0.328, the condition (3) that the deddendum tooth thickness Tb of the pinion 1 is sufficiently thick, namely since the deddendum tooth thickness Tb is set to be ±10% of the logix gear which has actual results with four teeth, 0.805 mm/1 module<the deddendum tooth thickness of the pinion 1 >0.327 mm/1 module, the condition (5) of prevention of interference of the tooth bottom portion, the condition (6) of the pressure angle >30°, and the condition (7) of the deddendum height h2 of the pinion 1 >0.24 mm/1 module.

The reason why the condition (7) is added newly, is that, when a change is performed from the reference tooth to the gear or pinion tooth, the deddendum height is prevented from being shortened extremely due to the pressure angle or the like. That is, the reason is that there is a possibility that, when the deddendum height becomes extremely small, the tooth of the deddendum does not exist due to machining error or the like in some cases, and, if so, the gear obtained does not serve as an actual gear. It is to be noted that the above 0.24 mm/1 module has been selected from the value of the logix gear with four teeth which has actual results.

According to the above calculations, the various parameters r1, r2, h1, h2, T, or the like are calculated by repeatedly performing the calculations for the above design conditions using the above numerical equations.

The calculation results will be explained with reference to FIGS. 7 to 10. First, in order to meet all the conditions (1) to (7), it is obtained from calculation that the tooth thickness ratio T must be put in a range of 0.655 to 0.741.

Figure 7:
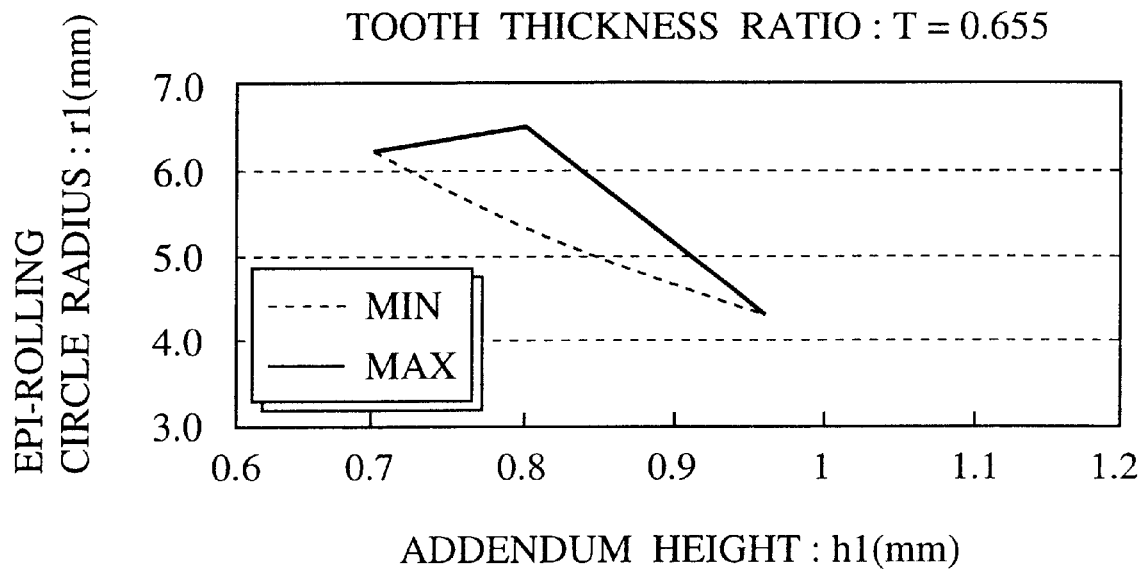
FIG. 7 is a diagram illustrating a calculation result of parameters for designing respective teeth of the cycloidal gear train with a high gear ratio and a relationship between addendum heights and epi-rolling circle radii for constituting a pinion with four teeth.
Figure 8:
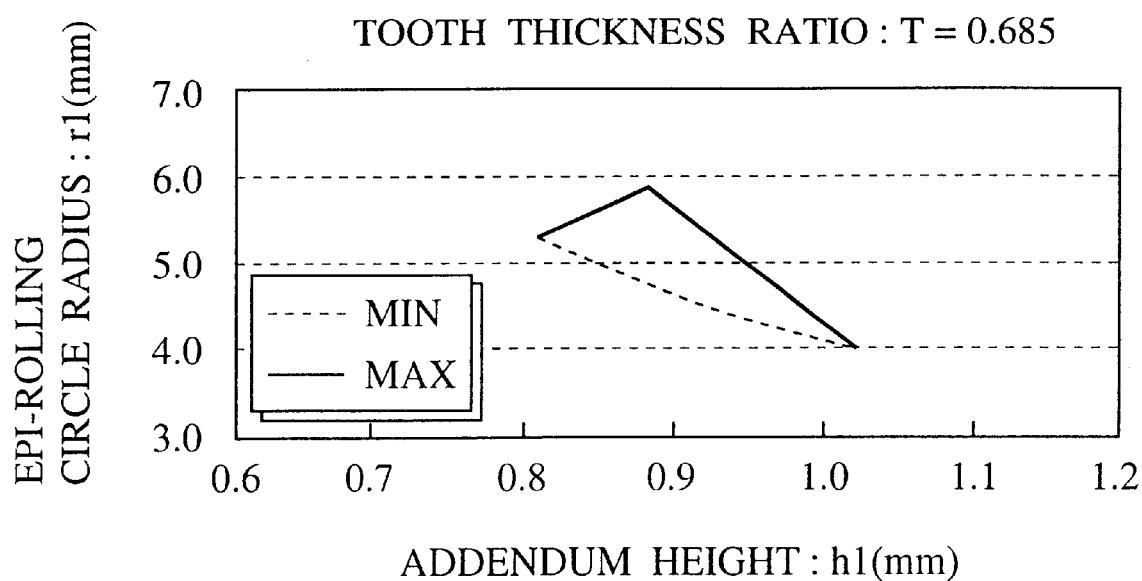
FIG. 8 is a diagram illustrating a calculation result of parameters for designing respective teeth of the cycloidal gear train with a high gear ratio and a relationship between addendum heights and epi-rolling circle radii for constituting a pinion with four teeth.
Figure 9:
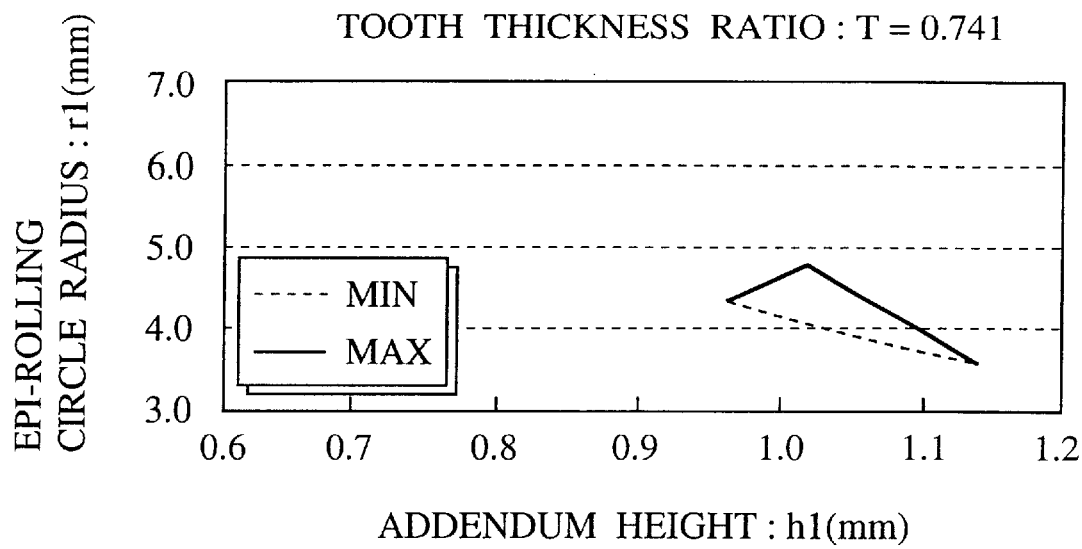
FIG. 9 is a diagram illustrating a calculation result of parameters for designing respective teeth of the cycloidal gear train with a high gear ratio and a relationship between addendum heights and epi-rolling circle radii for constituting a pinion with four teeth.

FIGS. 7 and 9 are respectively graphs illustrating relationships between h1 and r1 obtained when the tooth thickness is 0.741 which is the maximum value and when it is 0.655 which is the minimum value. FIG. 8 is a graph illustrating the relationship obtained when the tooth thickness is 0.685 which is a central value, which is shown for reference.

Namely, in a case where the tooth thickness T is 0.655, as shown in FIG. 7, the epi-rolling circle radius r1 meets the above conditions (1) to (7) at almost one point of 6.2 mm/1 module when the addendum height h1 is 0.68 mm/1 module, in a range of 5.3 to 6.5 mm/1 module when the addendum height h1 is 0.80 mm/1 module, and at almost one point of 4.3 mm/1 module when the addendum height h1 is 0.97 mm/1 module.

Furthermore, in a case where the tooth thickness T is 0.741, as shown in FIG. 9, the epi-rolling circle radius r1 meets the above conditions (1) to (7) at almost one point of 4.2 mm/1 module when the addendum height h1 is 0.96 mm/1 module, in a range of 4.0 to 4.7 mm/1 module when the addendum height h1 is 1.02 mm/1 module, and at almost one point of 3.5 mm/1 module when the addendum height h1 is 1.14 mm/1 module.

Accordingly, it is possible for the epi-rolling circle radius r1 to meet the above conditions (1) to (7) in a range of 3.5 to 6.5 mm/1 module.

Also, it is possible for the addendum height h1 to meet the above conditions (1) to (7) as a whole, namely in a range of 0.68 to 1.14 mm/1 module.

Figure 10:
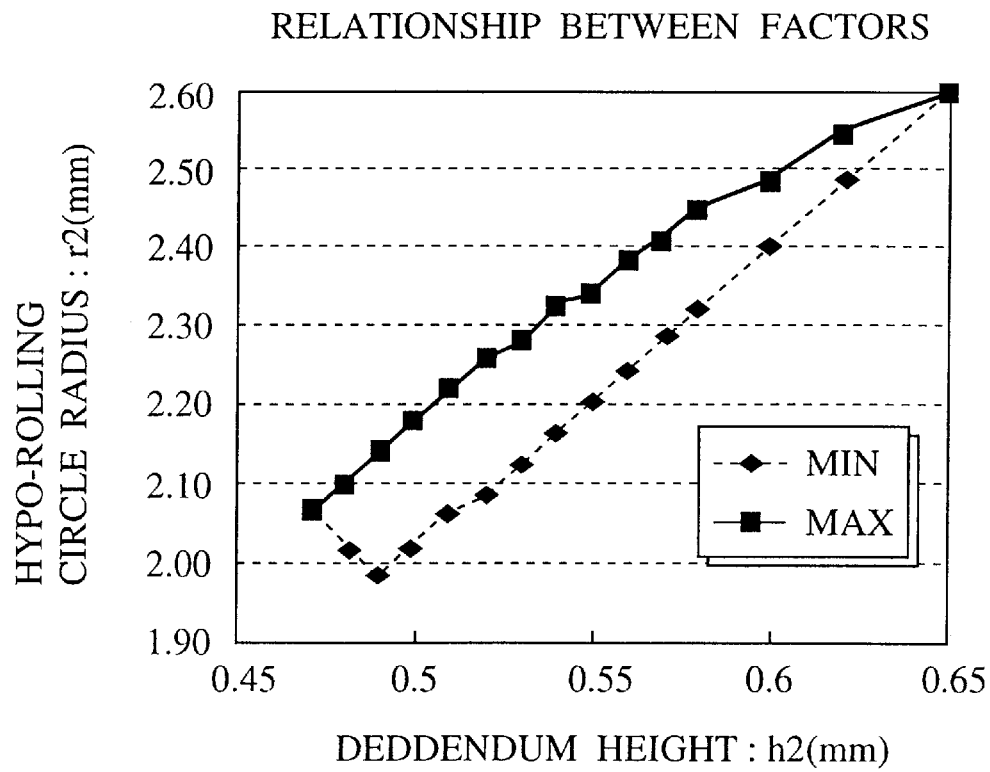
FIG. 10 is a diagram illustrating a calculation result of parameters for designing respective teeth of the cycloidal gear train with a high gear ratio and a relationship between deddendum heights and hypo-rolling circle radii for constituting a pinion with four teeth.
Figure 11:
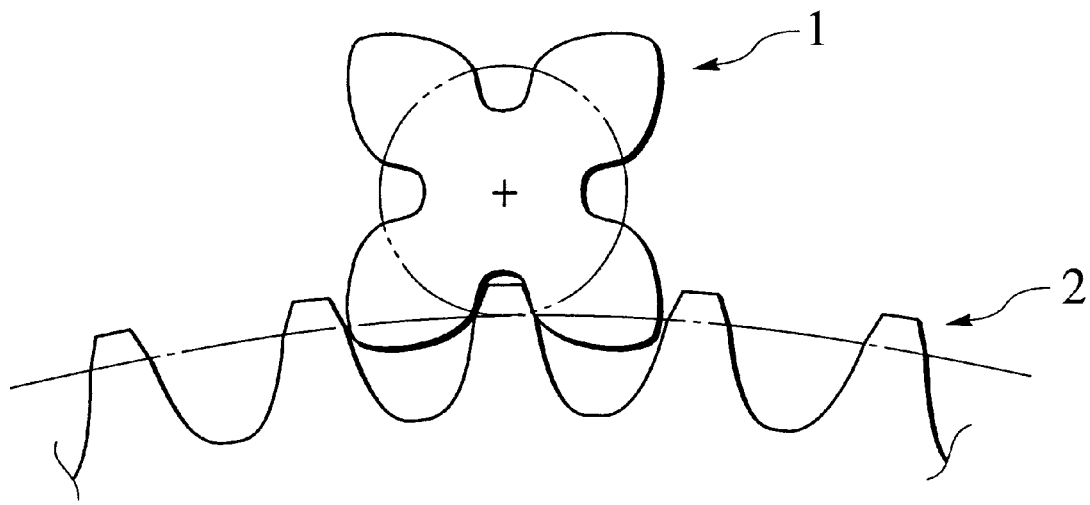
FIG. 11 is a front view illustrating the cycloidal gear train with a high gear ratio and illustrating a state where a rotation angle of the pinion is 0°.
Figure 12:
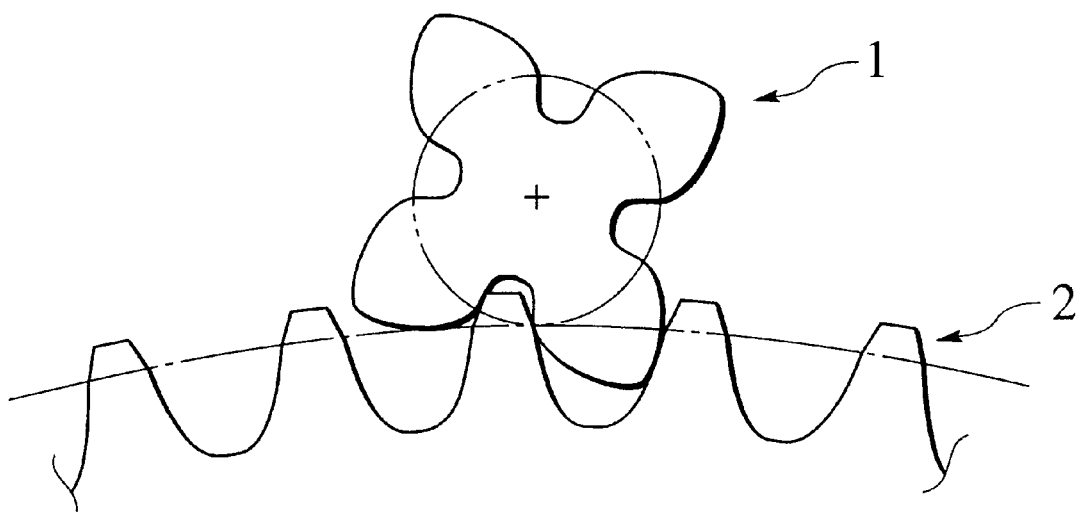
FIG. 12 is a front view illustrating the cycloidal gear train with a high gear ratio and illustrating a state where a rotation angle of the pinion is 15°.
Figure 13:
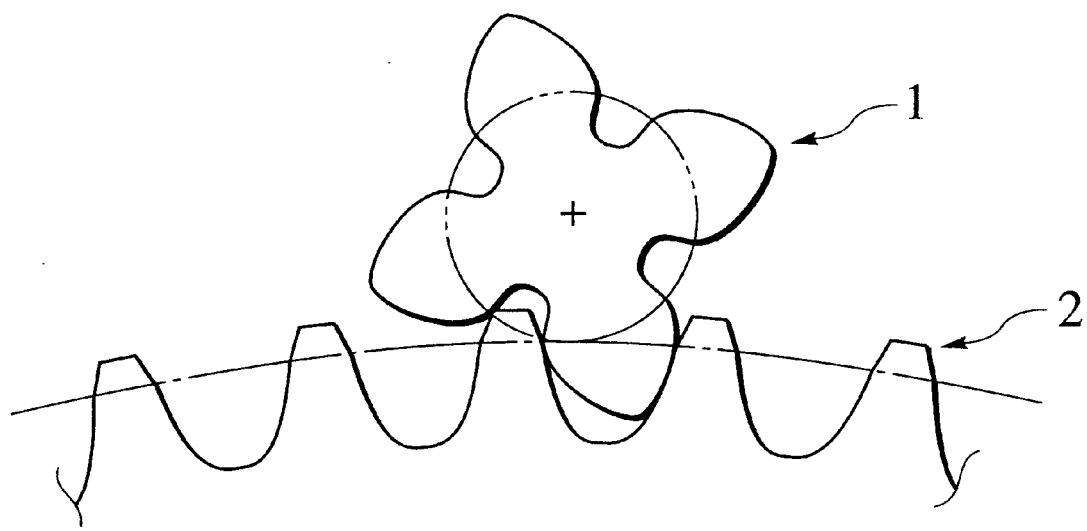
FIG. 13 is a front view illustrating the cycloidal gear train with a high gear ratio and illustrating a state where a rotation angle of the pinion is 30°.
Figure 14:
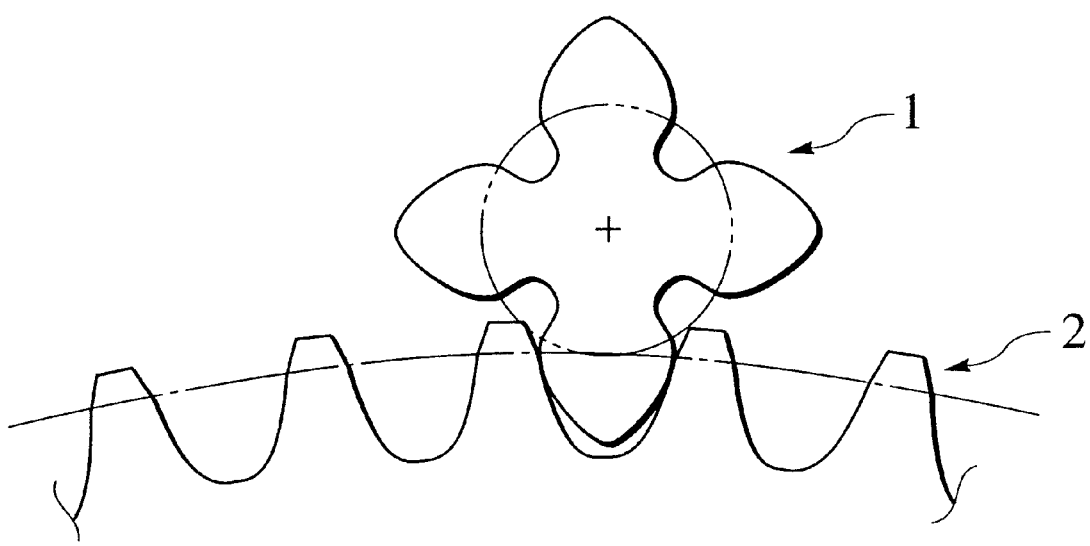
FIG. 14 is a front view illustrating the cycloidal gear train with a high gear ratio and illustrating a state where a rotation angle of the pinion is 45°.
Figure 15:
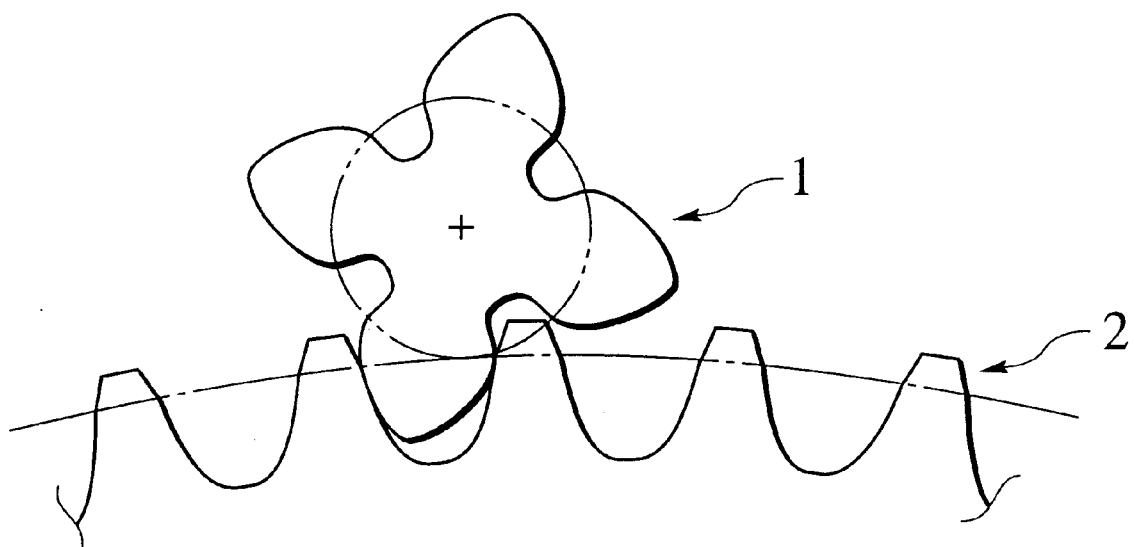
FIG. 15 is a front view illustrating the cycloidal gear train with a high gear ratio and illustrating a state where a rotation angle of the pinion is 60°.
Figure 16:
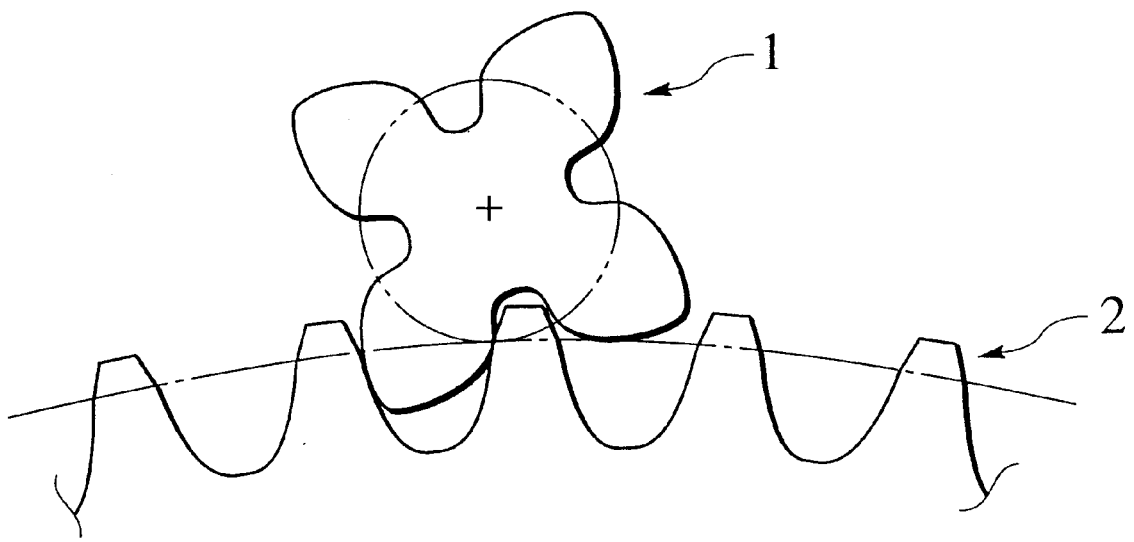
FIG. 16 is a front view illustrating the cycloidal gear train with a high gear ratio and illustrating a state where a rotation angle of the pinion is 75°.

Meanwhile, as shown in FIG. 10, when the deddendum height h2 of the pinion 1 is put in a range of 0.454 to 0.650, the calculation results meeting the above conditions (1) to (7) can be obtained. The hyo-rolling circle radius r2 of the pinion 1 meets the above conditions (1) to (7) at almost one point of 2.08 mm/1 module when the deddendum height h2 is 0.454 mm/1 module, in a range of 1.97 to 2.13 mm/1 module when the deddendum height h2 is 0.458 mm/1 module, and at almost one point of 2.60 mm/1 module when the deddendum height h2 is 0.650 mm/1 module. As a result, it is possible for hypo-rolling circle radius r2 to meet the above conditions (1) to (7) in a range of 1.97 to 2.60 mm/1 module as a whole.

Also, FIGS. 11 to 16 are diagrams showing states where the pinion 1 with four teeth designed in the above manner and the large gear 2 mesh with each other. The Figures show a course of the pinion 1 rotated each 15° from a state (FIG. 11) where its rotation angle is 0° up to a state (FIG. 16) where it is 75°. These Figures apparently show an aspect where rotating force is smoothly transmitted between the pinion 1 and the large gear 2 while they being securely meshing with each other.

As explained above, it is possible to provide the pinion 1 with four teeth having a strength which is endurable sufficiently in an actual use by setting the parameters within the predetermined ranges. Accordingly, when the pinion 1 with four teeth is used in a reduction gear mechanism, a large reduction ratio can be obtained at a stretch and the reduction gear mechanism can be reduced in size. Also, there is an advantage that, since a cycloid curve is used as a tooth, calculations for designing the pinion can be performed more easily than that for the logix gear and a gear with a desire number of teeth can be designed in a short time. In addition, as gears obtained in this invention meshes with each other via a convex face and a concave face designed according to the cycloid curves and therefore face pressure strength is made high, which results in improvement in durability. Furthermore, as sliding in tooth face or deddendum face is kept constant, wearing occurs in the face uniformly, which results in improvement in durability.

Also, as a gear with four teeth can easily be constituted as mentioned above, a gear with five or more teeth can easily be constituted. Accordingly, the present invention has an advantage that a gear with four or five tooth which can has not been constituted with an involute tooth can easily be constituted.

The entire contents of Japanese Patent Application P10-306055 (filed Oct. 27, 1998) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A cycloidal gear with a small number of teeth, comprising:
    a tooth of cycloid tooth,
    wherein the number of teeth is four or five;
    wherein the cycloidal gear with a small number of teeth meshes with a large gear with cycloid tooth to constitute a gear train;
    wherein a tooth thickness ratio (T) calculated assuming a circle pitch of the cycloidal gear with a small number of teeth as a denominator and a tooth thickness on a pitch circle of the cycloidal gear with a small number of teeth as a numerator, is 0.655 to 0.741;
    wherein epi-rolling circle radius (r1) of the cycloidal gear with a small number of teeth is 3.5 to 6.5 mm/l module;
    wherein hypo-rolling circle radius (r2) of the cycloidal gear with a small number of teeth is 1.97 to 2.60 mm/l module;
    wherein addendum height (h1) of the cycloidal gear with a small number of teeth is 0.68 to 1.14 mm/l module; and
    wherein deddendum height (h2) of the cycloidal gear with a small number of teeth is 0.454 to 1.650 mm/l module.

* * * * *